US005754349A

United States Patent [19]

Hon

[11] Patent Number: 5,754,349

[45] Date of Patent: May 19, 1998

[54] RETRACTABLE ILLUMINATING MAGNIFIER

[75] Inventor: Chan Chung Hon, New Territories, Hong Kong

[73] Assignee: Sunrich Manufactory Ltd., New Territories, Hong Kong

[21] Appl. No.: 778,811

[22] Filed: Jan. 3, 1997

[51] Int. Cl.[6] .................... G02B 7/02

[52] U.S. Cl. .................... 359/813; 359/800; 359/803; 359/808

[58] Field of Search .................... 359/800, 802, 359/803, 808, 810; 362/31

[56] References Cited

U.S. PATENT DOCUMENTS 4,037,940 7/1977 Yates et al. .................... 359/808

5,325,232 6/1994 Lahcanski et al. .................... 359/813

*Primary Examiner*—Loha Ben

*Attorney, Agent, or Firm*—McAulay Fisher Nissen Goldberg & Kiel, LLP

[57] ABSTRACT

A retractable magnifier includes an enclosure and a frame slidably mounted in the enclosure. The frame is slidable between a retracted position and two extended positions. A magnifying lens is mounted in the frame such that the lens is enclosed by the enclosure when the frame is in the retracted position, and such that the lens is exposed when the frame is in the extended position. A light with electric terminals is mounted in the frame, and is connected through a pair of conductive springs to a power source. One end of one spring is slidable in a slot in the frame to engage a switch terminal to automatically switch the light on when the frame is extended, and off when the frame is retracted.

23 Claims, 3 Drawing Sheets

RETRACTABLE ILLUMINATING MAGNIFIER

TECHNICAL FIELD

This invention relates to a viewing magnifier and more particularly, to an illuminating retractable magnifier.

BACKGROUND

The usefulness of magnifying devices is widely recognized, whether for making small objects and details visible, or simply for the convenience of reducing eye strain. For this reason, viewing magnifiers have been developed which enclose a magnifying lens in a retracted position to protect it from damage during nonuse, while allowing a person to access the magnifier whenever needed. One such devices is described in U.S. Pat. No. 2,297,723. Another magnifying device is described in U.S. Pat. No. 1,884,968, which has a flashlight combined with a reading glass which is manually rotated about a pivot.

However, currently available portable magnifiers have a number of shortcomings. Since the magnification of an object is often secondary to another task, such as manipulating small objects, it is desirable to have a magnifier whose operation requires minimal activity. Ideally, such a magnifier would be operable with a single hand, allowing the remaining hand to manipulate another object or tool. In many of the portable magnifiers to date, however, a magnifying lens is retracted from its enclosure by a pulling action, which requires two hands. It is even more inconvenient when an operator must separably activate a switch to turn on and off a light associated with the magnifier. In addition, magnifiers which have associated light sources tend to be bulky, thick, and not comfortably stored in a pocket of the user.

SUMMARY OF THE INVENTION

It is an object of the invention to provide an illuminating retractable magnifier with a protective casing.

It is a further object to provide an illuminating retractable magnifier which is operable with a single hand.

It is an additional object to provide an illuminating retractable magnifier which is compact and easily stored.

It is a further object to provide a magnifier which is simple in design, using minimum parts to reduce manufacturing costs.

These and other objects of the present invention are achieved by a portable magnifier having an enclosure, and a frame slidably mounted in the enclosure. The frame is slidable between a retracted position and an extended position. A magnifying lens which may include a region of enhanced magnification is mounted in the frame such that the lens is enclosed and protected by the enclosure when the frame is in the retracted position, and such that the lens extends from the enclosure when the frame is in the extended position. A light is mounted on the slidable frame for illuminating objects to be viewed with the magnifying lens. A spring switch is mounted in the enclosure for biasing the frame into the extended position, the spring switch connected to a power source for activating the light when the frame is in the extended position.

Using such a magnifier, there is no need for a separate switch, as extending the magnifier simultaneously activates the light. Parts are minimized as the spring substitutes for the switch and wiring found with a conventional light, thus minimizing manufacturing costs.

In one embodiment of the invention, the light has first and second electric light terminals, with the first light terminal being mounted at one end of a slot in the frame. A battery compartment is located in the enclosure, with the compartment including first and second electric source terminals. A conductive element is in conductive contact between the second light terminal and the second source terminal, thus permitting electric current to flow between the second light terminal and the second electric terminal. A conductive spring has a first end mounted on the first source terminal and a contact end disposed in the slot of the frame. The contact end is slidable within the slot between an engaged position in which the spring contact end is in conductive contact with the first light terminal and a disengaged position in which the contact end of the spring is out of conductive contact with the first light terminal, in effect, switching the light on and off simultaneously with the extension and retraction of the frame. A guide element is optionally provided to guide the spring contact end as the frame is moved to the extended position.

The conductive spring with the slidable contact end is in the disengaged position when the frame is in the retracted position. A stop element is preferably provided which abuts the spring as the frame is moved to the retracted position to force the contact end of the spring out of contact with the first light terminal, thereby interrupting current flow and turning off the light. A battery compartment or a leg provided on the frame can be employed as the stop element.

The portable magnifier may further include a releasable detent for holding the frame in the retracted position, and a release mechanism mounted on the enclosure for releasing the detent.

A portable magnifier according to the invention is compact and simple to operate with a single hand. A user can simply release the detent to both extend the lens and to turn on the light. The lens can be retracted and the light turned off simply by forcing the frame back into the enclosure.

With the use of springs as switch components and current carriers, the number of parts in the magnifier is reduced, thus controlling the costs of manufacturing and simplifying the assembly of the magnifier.

DETAILED DESCRIPTION OF THE INVENTION

Figure 1:
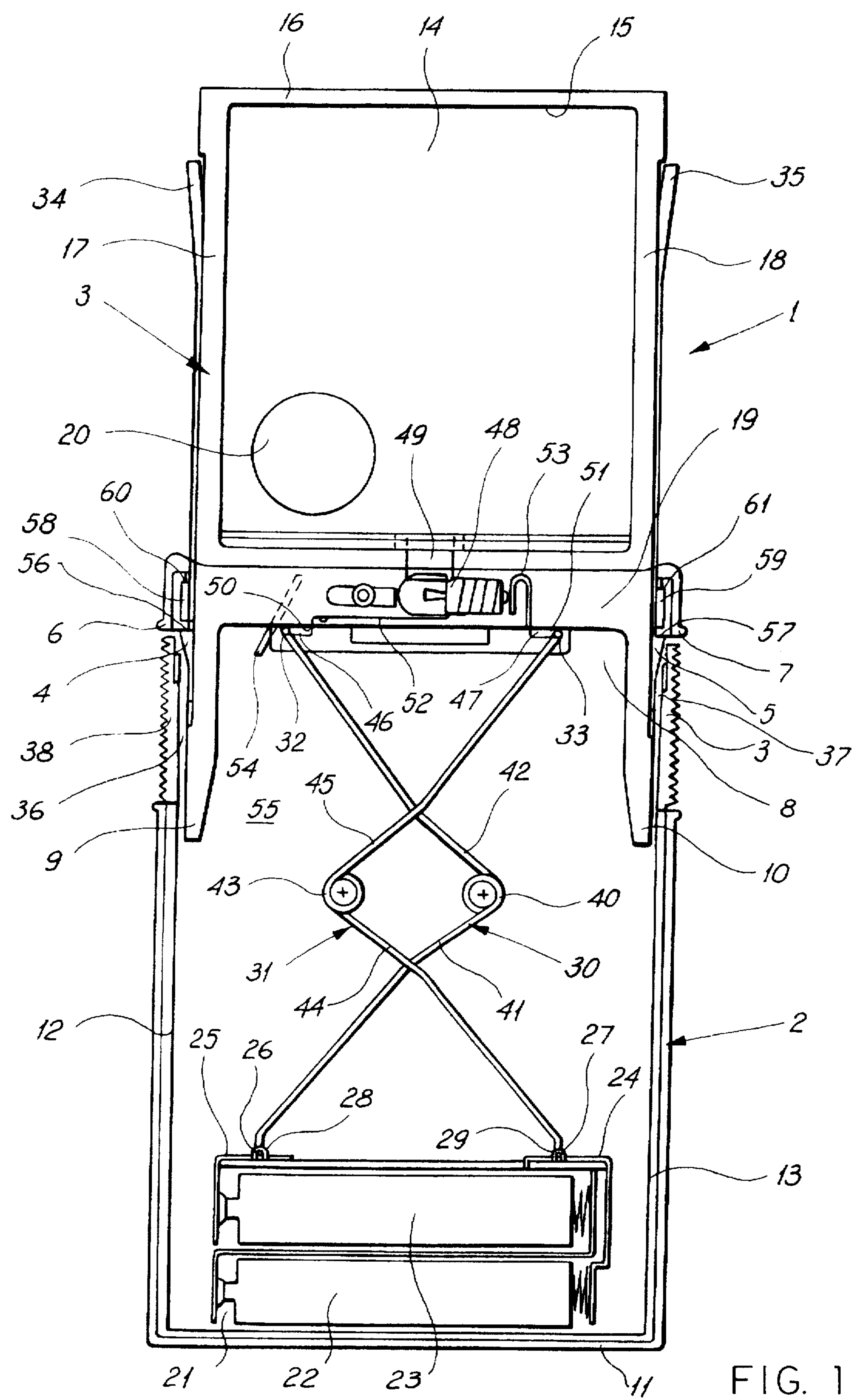
FIG. 1 is a cross-sectional view of a retractable illuminated magnifier in accordance with the present invention, showing the magnifier in the first extended position.
Figure 2:
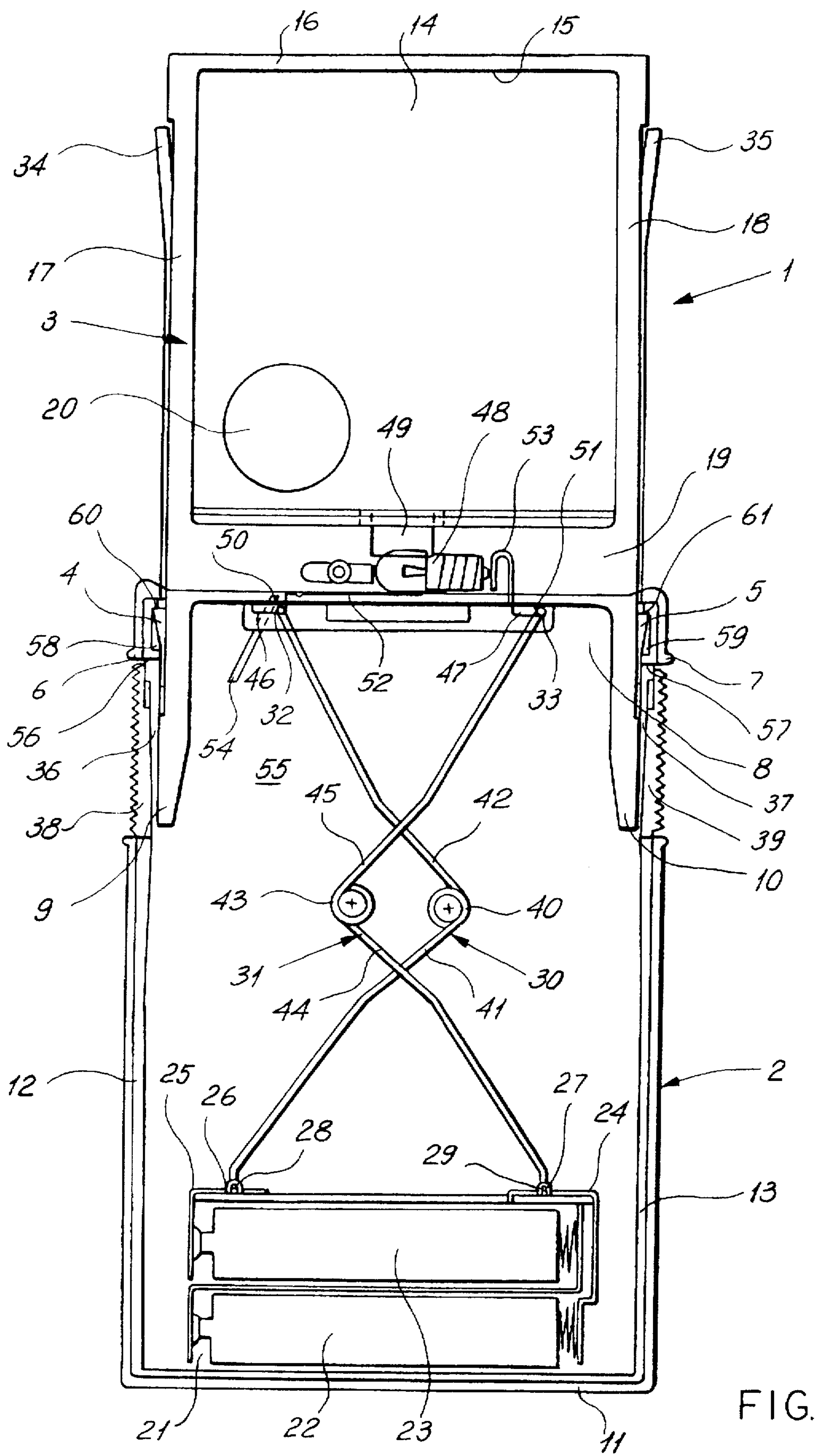
FIG. 2 is a cross-sectional view of a retractable illuminated magnifier in accordance with the present invention showing the magnifier in the second extended position.
Figure 3:
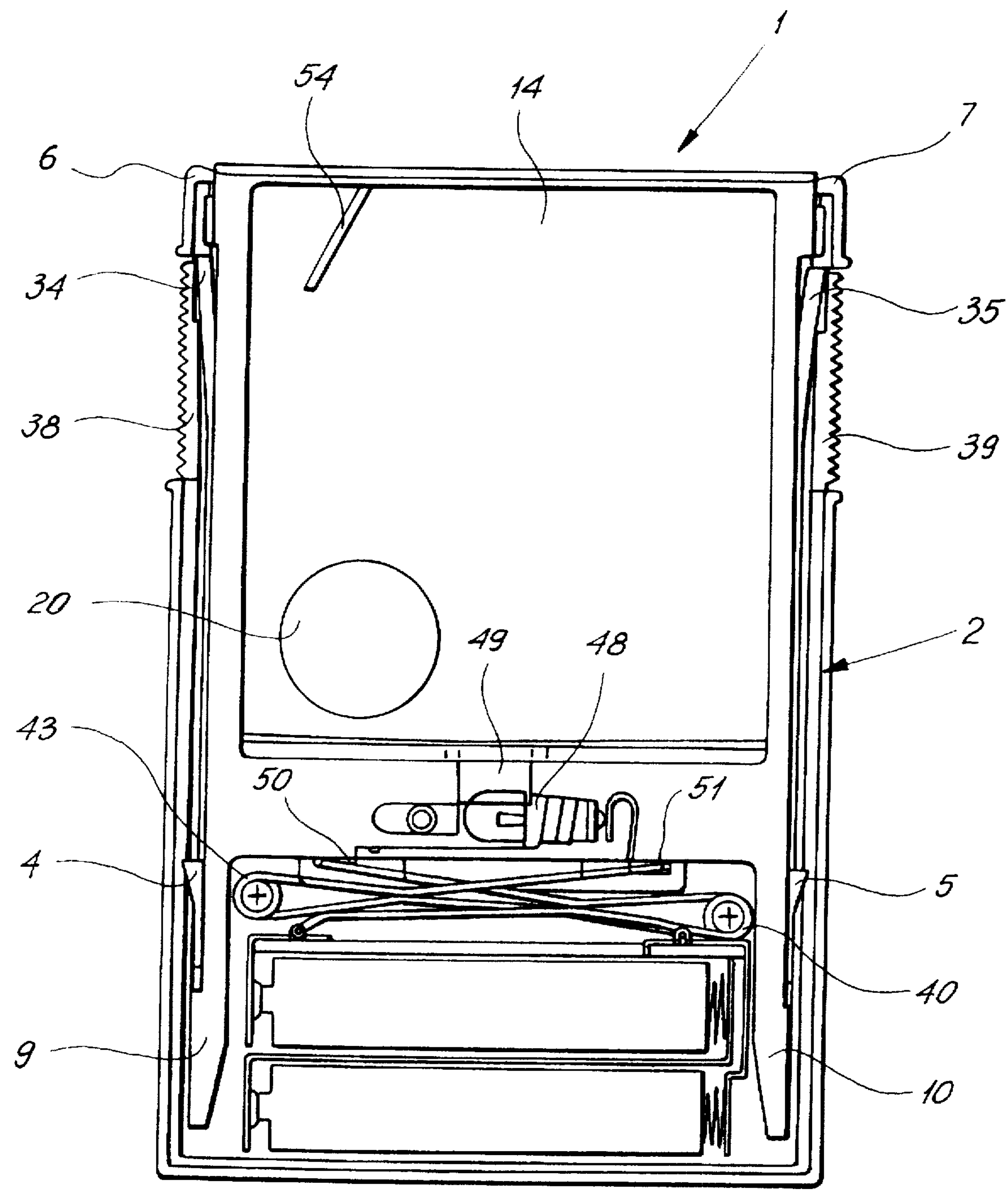
FIG. 3 is a cross-sectional view of a portable illuminated magnifier in accordance with the present invention, showing the magnifier in the retracted position.

Referring to FIG. 1, a portable retractable magnifier 1 according to the present invention includes an enclosure 2 and a frame 3 slidably mounted in the enclosure. The frame 3 is slidable between a first extended position, as illustrated in FIG. 1, a second extended position, as illustrated in FIG. 2, and a retracted position, as illustrated in FIG. 3. Two outwardly projecting detents 4 and 5 integrally formed on the frame 3 engage two corresponding shoulders 6 and 7, respectively, in a forward portion 8 of the enclosure 2 when the frame 3 is in the first extended position. The detents 4 and 5 act as stops to prevent the frame from sliding further out of the enclosure. The frame has two legs 9 and 10 which aid in guiding the frame as it slides while also preventing disalignment of the frame when extended. These legs project towards a back wall 11 of the enclosure and ride along two sidewalls 12 and 13 of the enclosure. A magnifying lens 14 is mounted in an opening 15 in the frame, surrounded by a front wall 16, two side walls 17 and 18 and a rear wall 19. The lens 14 is fully exposed when the frame is in the extended position. The lens 14 is optionally provided with a region 20 of enhanced magnification for the viewing of especially small details.

A battery compartment 21 is included inside the enclosure 2 for directing power from two batteries 22 and 23 to two terminals 24 and 25. The terminals 24 and 25 have receptacles 26 and 27 for providing a hinged attachment to two ends 28 and 29 of two springs 30 and 31, respectively. The opposite ends 32 and 33 of the springs are engaged with the frame 3 and resiliently bias the frame into the extended positions. To retract the frame and the lens, the frame is manually forced against the bias of the springs 30 and 31 into the enclosure. The frame has two outwardly biased movable detent members 34 and 35 on the sides 17 and 18 of the frame which are inwardly displaced as they pass by the shoulders in the enclosure. These snap outwardly when they enter two side recesses 36 and 37 in the enclosure 2 to hold the frame 3 in the retracted position.

The frame 3 can be released from the retracted position by manually applying force to two movable tabs 38 and 39 mounted within the recesses on sides 12 and 13 of the enclosure 2. When pressed, these tabs press in the detents 34 and 35, thus releasing the detents from engagement with the shoulders. This allows the springs 30 and 31 to force the frame 3 into the first extended position.

The springs 30 and 31 are made of a conductive material capable of transmitting electrical current. The spring 30 is preferably comprised of torsional spring portion in the form of a coil 40 with two arms 41 and 42. The arm 41 has the contact end 28 and the arm 42 has the contact end 32. Likewise, the spring 31 has a torsional coiled spring portion 43 and two arms 44 and 45 with the arm 44 having the contact end 29 and the arm 45 having the contact end 33. The ends 28 and 29 are located in the receptacles 26 and 27 on the battery housing. The ends 32 and 33 are received in respective slots 46 and 47 in the frame and are slidable therein. The springs 30 and 31 are opposed to one another and spaced apart to prevent contact which could cause a short circuit.

A light 48 is mounted in a window 49 on the rear wall 19 of the frame 3. The light 48 has two electrical terminals 50 and 51 connected by two wires 52 and 53 to the light 48. The electrical terminal 50 is mounted at one end of the slot 46 in the frame 3. The electrical terminal 51 is mounted along a side of the slot 47. Each slot receives a contact end of each spring, and each contact end is slidable along the inside of the slot. However, depending on the location of the electrical terminal, conductive contact is either continuous or intermittent. In this embodiment, the contact end 33 of the spring 31 is in continuous contact with the electrical terminal 51, sliding along the terminal as the frame is extended and retracted. The contact end 32 of the spring 30 is in intermittent contact with the electrical terminal 50 because it must slide into and out of contact with the end of the slot.

When the spring contact end 32 is in contact with the electrical terminal 50, the circuit is completed from the battery terminals, through the springs and metal contact plates to the light, and the light 48 is illuminated. This only occurs when the frame is released to the second extended position, as will be discussed below. When the spring contact end 32 is separated from the electrical terminal 50, the circuit is open and the light is turned off. This occurs when the frame travels to the retracted position.

In the magnifier 1, the light 48 is turned on and off automatically during the second incremental extension and retraction, respectively, of the frame without requiring activation of a separate switch. When the frame is in the first extended position as illustrated in FIG. 1 and the retracted position, as illustrated in FIG. 3, the spring contact end 32 is separated from the terminal 50.

To assure contact of the end 32 with the terminal 50, the spring contact end engages an angled guide rail 54 mounted on a wall 55 of the enclosure, extending upwardly as illustrated in FIG. 1. The guide rail is positioned, relative to the slot 46 so that when the frame is moved from the first to the second extended position, the rails form a guide which forces the contact end 32 to move towards the terminal 50. Thus, the end 32 is only slidable in the slot in the retracted to near second extended position. Once fully extended, such sliding movement is prohibited. Consequently, vibration or other slight movements will not cause the circuit to open.

To extend from the retracted position, the tabs 38 and 39 are depressed, releasing the detents 34 and 35. The springs 30 and 31 then force the frame with the lens to eject into the first extended position. At this stage, the frame 3 is not yet fully extended and the light 48 is still not yet turned on. When the tabs 38 and 39 are depressed again, the springs 30 and 31 further force the frame 3 with the lens 14 to extend an incremental amount. The detents 4 and 5 are inwardly displaced as they pass by stops 56 and 57, then snap outwardly when they move into two side recesses 58 and 59 in shoulders 6 and 7 to hold the frame 3 in the second extended position as shown in FIG. 2. At this time, the frame 3 is fully extended and the light 48 is automatically turned on.

As the frame 3 is returned to the retracted position, the two springs 30 and 31 are compressed, forcing the coils 40 and 43 to move outwardly, toward the sidewalls. When the frame 3 is fully retracted, as in FIG. 3, the coil 40 comes into contact with the leg 10 to prevent any further outward movement of the coil. Thus, with full retraction of the frame 3, the contact end 32 is directed to the far side of the slot 46, away from the switching terminal 50, to keep the light off. Of course, other elements could be used to assure that the contact end remains disengaged from the terminal 50. For example, an extension of the battery compartment may be employed, or an additional stop element similar to the guide rail may be provided inside the enclosure 2.

The switching action exhibited by the spring 30 is dependent only on the relative sliding motions of the frame and the enclosure, and various modifications can be made to the layout of the magnifier while preserving the switching action. For example, a slot with a switching contact can be provided on the battery compartment instead of on the frame, and both slots on the frame could incorporate end terminals with guide rails.

To minimize the size and thickness of the magnifier 1, it is preferred that the battery compartment 21, light 48, and lens 14 be arranged in substantially the same plane, so that they do not overlap.

The magnifying lens may include a first region having a first magnification and a second region having a second magnification, the second magnification being higher than the first magnification.

The enclosure, the frame, and the lens are preferably of a substantially rectangular shape, though of course other shapes can be used.

The present invention provides several unique advantages. The use of a double spring system maximizes the size of the lighted magnifying lens relative to the enclosure to maintain a much slimmer pocket sized protective case than any of those shown in the patents discussed in this application. If a conventional spring and electrical system were used, additional space would be required in the enclosure requiring either a larger enclosure or smaller magnifying lens. Unlike any of the prior art, the invention thus provides the largest magnifier to be used within the limited enclosure space necessary for being pocket sized. This is in addition to the unprecedented features of combining a light with the magnifier which can be switched on with one hand operation, pressing the button once will extend the magnifier from the enclosure and pressing the button once more automatically actuates the light. The holder therefore has the choice of using the magnifier with or without the light. None of the prior patents has a magnifying lens retractable into a protective case which is so slim and compact of dimensions, being only slightly greater than the length and thickness of the lens used. Another feature of the invention distinguished from all prior patents is the economy in construction, due to the limited number of parts, which also assures more reliable operation as there are less parts subject to malfunction.

Although the invention has been described in terms of particular embodiments and applications, one of ordinary skill in the art, in light of this teaching, can generate additional embodiments and modifications without departing from the scope of the claimed invention. Accordingly, it is understood that the drawings and descriptions are merely examples to facilitate comprehension of the invention and should not be construed to limit the scope thereof.

What is claimed is:

1. A retractable magnifier comprising:

an enclosure;

a frame slidably mounted in the enclosure, the frame being slidable between a retracted position and an extended position;

a magnifying lens mounted in the frame such that the lens is enclosed by the enclosure when the frame is in the retracted position, and such that the lens is extended from the enclosure when the frame is in the extended position;

a light mounted on the frame, the light connected to first and second electric light terminals mounted in the frame;

a battery compartment mounted in the enclosure, the compartment including first and second electric source terminals;

a conductive element in conductive contact between the second light terminal and the second source terminal;

a conductive spring having a first end in contact with the first source terminal and a second end, the second end being movable between an engaged position in which the second spring end is in conductive contact with the first light terminal and a disengaged position in which the second spring end is out of conductive contact with the first light terminal, the spring biasing the frame into the extended position.

2. The magnifier of claim 1, further comprising:

a guide element for guiding the second spring end into conductive contact with the first light terminal when the frame is in the extended position.

3. The magnifier of claim 2, wherein the guide element is an angled rail mounted on a wall of the enclosure.

4. The magnifier of claim 1, wherein the conductive element is an additional conductive spring.

5. The magnifier of claim 1, wherein the conductive spring is in the disengaged position when the frame is in the retracted position.

6. The magnifier of claim 1, further comprising a stop element, the stop element abutting the conductive spring to force the second spring end out of contact with the first light terminal.

7. The magnifier of claim 6, wherein the stop element is a leg of the frame.

8. The magnifier of claim 1, further comprising at least one releasable detent for holding the frame in the retracted position, the enclosure having at least one shoulder for engaging the detent.

9. The magnifier of claim 1, further comprising a release mechanism mounted on the enclosure for releasing the frame.

10. The magnifier of claim 1, wherein the lens includes a region of enhanced magnification.

11. A retractable magnifier comprising:

an enclosure;

a frame slidably mounted in the enclosure, the frame being slidable between a retracted position and an extended position;

a magnifying lens mounted in the frame;

a light mounted on the frame and movable therewith;

an electric circuit for supplying electric current to the light; and a spring switch incorporated in the electric circuit for turning the light on and off, the switch being actuated by the position of the frame such that the light is on when the frame is extended and off when the frame is retracted, the spring switch mounted in the enclosure for biasing the frame into the extended position.

12. The portable magnifier of claim 11, further comprising:

a spring mounted in the enclosure and engaged to the frame for biasing the frame into the extended position; and a releasable detent mounted in the frame for holding the frame in the retracted position, the enclosure having a shoulder for engaging the detent.

13. The magnifier of claim 12, wherein the frame has two outwardly biased detents mounted on opposite sides of the frame, the enclosure having two corresponding shoulders, a pair of inwardly movable tabs mounted on opposite sides of the enclosure next to the shoulders such that pressing the tabs releases the detents from the shoulders.

14. The magnifier of claim 13 further comprising:

biased detents mounted in a rearranged portion of the frame, for stopping the frame in the extended position, release of the second detents by the movable tabs causing further extension of the frame to a second extended position.

15. The magnifier of claim 11, further comprising a release mechanism mounted on the enclosure for releasing the detent from the shoulder.

16. The magnifier of claim 11, wherein the magnifying lens includes a region of higher magnification.

17. The magnifier of claim 11, wherein the enclosure, frame, and lens are substantially rectangular.

18. The magnifier of claim 11, wherein the light and lens are mounted in substantially the same plane.

19. A portable magnifier comprising:

an enclosure;

a frame slidably mounted in said enclosure between a retracted position and an extended position;

a magnifying lens mounted in said frame;

a light mounted on the frame, said light connected to first and second electric light terminals;

first and second electric source terminals mounted in the enclosure for supplying electric current to said light;

an electric circuit for connecting the light to a power source, the circuit including a conductive spring having a first end engaged with the first light terminal and a second end engaged with the power source, the spring biasing the frame into the extended position.

20. The magnifier of claim 19, wherein one of the frame and the enclosure includes a slot, one end of the spring being engaged in the slot and slidable in the slot, one of the source and terminals mounted at one end of the slot, the one end of the spring being slidable within the slot between a first position in engagement with the terminal and a second position separated from the terminal.

21. The magnifier of claim 19, further comprising a guide element engageable with the spring for guiding one end of the spring into engagement with the terminal.

22. The magnifier of claim 19, further comprising a stop element, the stop element abutting the spring to force the spring out of contact with the terminal.

23. A method for providing a retractable illuminated magnifier comprising:

providing an enclosure;

slidably mounting a frame in the enclosure, the frame slidable from a retracted position within the enclosure to an extended position where the frame extends beyond the enclosure;

mounting a magnifying lens in the frame;

mounting a light on the frame adjacent to the lens;

connecting the light to a pair of light terminals located on the frame providing a power source having a pair of source terminals; and providing at least one spring switch between a light terminal and a source terminal, an end of the spring switch movable into and out of contact with the light switch in correspondence with the extended and retracted position of the frame.

* * * * *